United States Patent [19]

Schaff

[11] Patent Number: 5,131,742
[45] Date of Patent: Jul. 21, 1992

[54] ACOUSTO-OPTIC SPECTROMETER/POLARIMETER

[75] Inventor: Fred L. Schaff, Spring Grove, Pa.
[73] Assignee: Westinghouse Electric Corp., Pittsburgh, Pa.
[21] Appl. No.: 597,457
[22] Filed: Oct. 12, 1990
[51] Int. Cl.[5] .................. G01N 21/00; G01J 3/447
[52] U.S. Cl. ........................................ 356/73; 358/305
[58] Field of Search .............. 356/73, 364, 367; 250/338.1; 350/358; 359/308, 311, 305, 307

[56] References Cited

U.S. PATENT DOCUMENTS

| 3,631,254 | 12/1969 | Covault | 356/367 |
|---|---|---|---|
| 4,115,006 | 9/1978 | Reymond et al. | 356/152 |
| 4,575,186 | 3/1986 | Gottlieb et al. | 350/358 |
| 4,644,267 | 2/1987 | Tsui et al. | 324/77 |
| 4,653,869 | 3/1987 | Gottlieb et al. | 350/372 |

FOREIGN PATENT DOCUMENTS 61-215533  9/1986  Japan .
667940  6/1979  U.S.S.R. .

Primary Examiner—Vincent P. McGraw
Assistant Examiner—LaCharles P. Keesee, II
Attorney, Agent, or Firm—T. H. Martin

[57] ABSTRACT

An acousto-optic spectrometer/polarimeter for analyzing an incident broad-band beam including an acousto-optic tunable filter (AOTF) for separating the incident broad-band beam into a diffracted extraordinary narrow-band beam, a diffracted ordinary narrow-band beam, and at least one undiffracted broad-band beam; first, second and third detectors respectively positioned to respectfully receive at least a portion of the diffracted extraordinary narrow-band beam, the diffracted ordinary narrow broad-band beam and the at least one undiffracted broad-band beam, and to respectively provide first, second and third signals based thereon; a subtracter for providing a polarimeter output by taking the difference between the first and the second signals; and an adder for providing a spectrometer output by adding the first and the second signals. The acousto-optic spectrometer/polarimeter according to the present invention allows broad-band imaging, spectroscopy and polarimetry to be performed simultaneously and through the same optical aperture.

19 Claims, 5 Drawing Sheets

ACOUSTO-OPTIC SPECTROMETER/POLARIMETER

BACKGROUND OF THE INVENTION

1. Field of the Invention

The present invention relates generally to an acousto-optic analyzer, and more particularly to an acousto-optic spectrometer/polarimeter for performing ultraviolet, visible and infrared imaging spectroscopy; and polarimetry simultaneously and through the same optical aperture.

2. Description of the Related Art

Historically, imaging has been accomplished with photographic film and electro-optical devices. Early examples of these devices were used to identify and record visible broad-band images, i.e., images that may be seen by the human eye. However, more information is contained in a typical scene than can be found through visible broad-band imaging. For example, scenes often contain information that is broad-band, but beyond the range of the human eye. Consequently, imaging devices that identify and record an image from ultraviolet and infrared radiation in a scene were developed.

Also, scenes contain narrow-band spectra information, i.e., electromagnetic spectra arising from either emission or absorption of radiant energy. Narrow-band spectral filters are used to obtain this narrow-band information. For example, hot emission spectra may be used to identify heated elements and molecules by viewing in several narrow-bands so that color is measured. In addition, if an object is semi-transmissive, its makeup may be identified by its absorption spectra using narrow-band spectral filters.

Light that is emitted or reflected from a scene may be directionally polarized. Polarization information may be obtained with a polarization sensor. As the angular orientation of the polarization sensor is changed, the amount of directionally polarized light observed by the polarization sensor also changes, thereby permitting determination of the polarization direction of the directionally polarized light.

All of the above-mentioned types of scene information may be measured with conventional imaging devices. However, the most accurate scene information would be obtained by observing all of the abovementioned types of information simultaneously and through the same optical aperture. This technique would obviate the need for separating spatial errors, temporal errors and system errors before analysis of the image. Although the above-mentioned types of scene information have been obtained simultaneously with conventional imaging devices, they have not been obtained from a common aperture.

One conventional type of optical narrow-band device is the acousto-optic tunable filter (AOTF). In an AOTF, an acoustic wave is transduced in a bi-refringent material by electromagnetic energy and interacts with radiation in the optical domain, i.e., from the ultraviolet region through the infrared region. Broad-band light enters the AOTF in a quasi-collimated beam and is mixed and diffracted in the bi-refringent material by the acoustic wave into two filtered narrow-band light beam and a broad-band light beam. The wavelength of each of the filtered narrow-band light beams depends upon the wavelength of the acoustic wave, i.e., the wavelength of each of the filtered narrow-band light beams is inversely proportional to the wavelength of the acoustic wave. In a conventional AOTF, one of the filtered narrow-band beams is typically used for analysis, while the broad-band light beam and the second narrow-band beam is rejected.

SUMMARY OF THE INVENTION

An object of the present invention is to provide an acousto-optic spectrometer/polarimeter for performing ultraviolet, visible, and infrared imaging; spectroscopy; and polarimetry simultaneously and through the same optical aperture.

Another object of the present invention is to provide an acousto-optical spectrometer/polarimeter for obtaining ultraviolet, visible, and infrared image information; spectral information; and polarization information having common spatial errors, common temporal errors and common system errors, which need not be separated before analysis.

These and other objects are accomplished by an acousto-optic spectrometer/polarimeter according to the present invention, which comprises: an AOTF for separating incoming broad-band light so as to provide an extraordinary polarized narrow-band beam, a broad-band residual beam and an ordinary polarized narrow-band beam; at least three detectors respectively positioned to respectively receive the extraordinary polarized narrow-band beam, the broad-band residual beam and the ordinary polarized narrow-band beam and to respectively produce a first, a second and a third electromagnetic signal respectively based on the extraordinary polarized narrow-band beam, the broad-band residual beam, and the ordinary polarized narrow-band beam; means for taking the difference between the first signal and the third signal; and means for adding the first signal and the third signal.

In another aspect of the present invention, an acousto-optic spectrometer/polarimeter according to the present invention further includes means for correcting the output of the means for taking the difference between the first signal and the third signal, and the output of the means for adding the first signal and the third signal, based on the second signal.

In yet another aspect of the present invention, an acousto-optic spectrometer/polarimeter according to the present invention further includes means for operating the AOTF at substantially 100 percent diffraction efficiency by adjusting at least one of the power and pulse width for each frequency of a radio frequency signal that transduces an acoustic wave in the AOTF.

These and other features and advantages of the present invention will become more apparent with reference to the following detailed description and drawings.

BRIEF DESCRIPTION OF THE DRAWINGS

The above, as well as other features and advantages of the present invention, will become apparent through consideration of the detailed description in connection with the accompanying drawings. Throughout the drawings, like reference numerals depict like elements. In the drawings.

DETAILED DESCRIPTION OF THE PREFERRED EMBODIMENTS

The present invention uses acousto-optic tunable filters (AOTF) to provide a common spatial and temporal aperture that greatly advances the fusion of sensor information for ultraviolet, visible, and infrared imaging; spectroscopy; and polarimetry.

Figure 1:
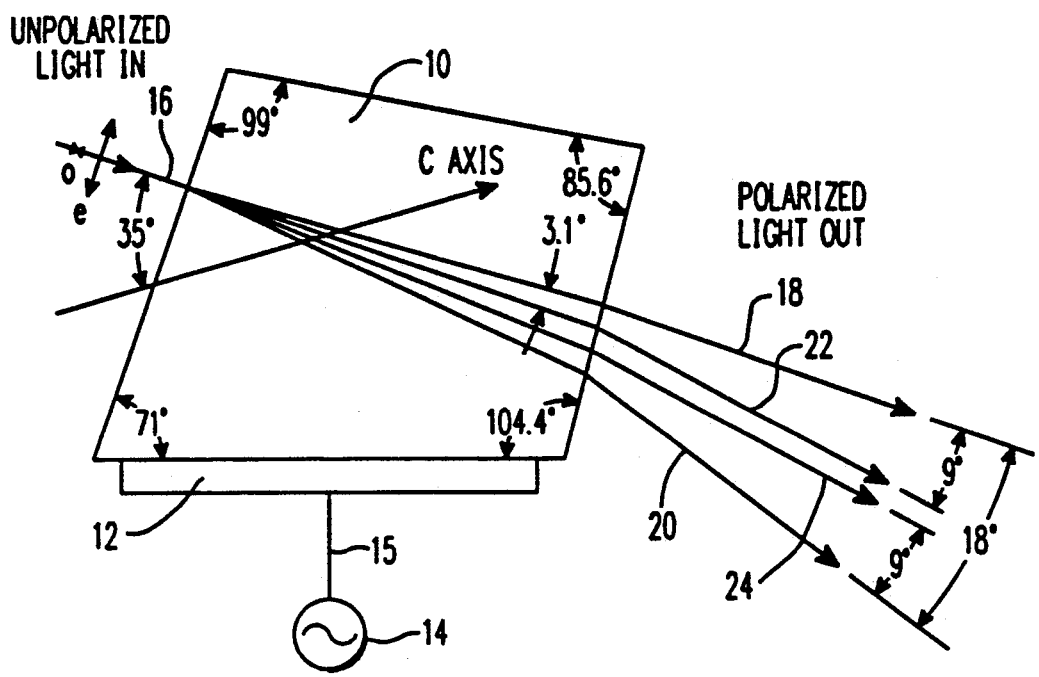
FIG. 1 is a side view of an AOTF of an acousto-optic spectrometer/polarimeter according to the present invention.

FIG. 1 shows a side view of an AOTF 10 of an acousto-optic spectrometer/polarimeter according to the present invention. The AOTF 10 is preferably made of a bi-refringent material, such as quartz, tellurium dioxide, thallium arsenic selenide, and the like. Birefringent materials are preferred in the construction of AOTF 10 because bi-refringent materials allow high diffraction efficiency of narrow-band light into a first diffracted order, i.e., separation of narrow-band polarized light from a broad-band optical source. Other optical materials exhibit the acousto-optic effect, but do not allow for such a high diffraction efficiency, and therefore bi-refringent materials are preferred.

Acoustic waves are transduced in AOTF 10 by a transducer 12, which is driven by a radio frequency (RF) drive 14 producing a RF signal 15. Broad-band light enters AOTF 10 in a quasi-collimated beam 16 and is mixed and diffracted in AOTF 10 into a diffracted extraordinary narrow-band beam 18, a diffracted ordinary narrow-band beam 20, an undiffracted ordinary broad-band beam 22, and an undiffracted extraordinary broad-band beam 24. Diffracted extraordinary narrow-band beam 18 is narrow-band filtered and polarized in a first polarization direction, and diffracted ordinary narrow-band beam 20 is identical to diffracted extraordinary narrow-band beam 18 except for having a normal polarization, i.e., 90° from the first polarization direction of diffracted extraordinary narrow-band beam 18. Undiffracted ordinary broad-band beam 22 and undiffracted extraordinary broad-band beam 24 are separated by such a small angle that they can be considered to contain the sum total of the unfiltered, undiffracted light energy.

The angular separations among diffracted extraordinary narrow-band beam 18, diffracted ordinary narrow-band beam 20, undiffracted ordinary broad-band beam 22, and undiffracted extraordinary broad-band beam 24 are determined by a combination of factors. These factors include the material from which AOTF 10 is made. Generally, a relatively large angular separation is provided by an AOTF material having a large difference between its ordinary index of refraction and its extraordinary index of diffraction. Also, the crystalline orientation of AOTF 10, labeled as a "C AXIS" in FIG. 1, relative to the quasi-collimated beam 16 will affect the angular separation. In addition, the physical size of AOTF 10 and the angular aperture of quasi-collimated beam 16 must be such that none of beams 18, 20, 22, 24 are reflected off corners and sides within AOTF 10.

If quasi-collimated beam 16 is unpolarized or circularly polarized, then diffracted extraordinary narrow-band beam 18 and diffracted ordinary narrow-band beam 20 each have one-half of the total energy available from quasi-collimated beam 16 at the wavelength of diffracted extraordinary narrow-band beam 18 and diffracted ordinary narrow-band beam 20. On the other hand, if quasi-collimated beam 16 is directionally polarized, diffracted extraordinary narrow-band beam 18 and diffracted ordinary narrow-band beam 20 each have from zero to 100% of the total energy available from quasi-collimated beam 16 at the wavelength of diffracted extraordinary narrow-band beam 18 and diffracted ordinary narrow-band beam 20, depending on the angular orientation of AOTF 10 relative to the direction of polarization.

The wavelength of diffracted extraordinary narrow-band beam 18 is equal to the wavelength of diffracted ordinary narrow-band beam 20, and is determined by the frequency of an RF signal 15 produced by RF drive 14 to transduce the acoustic wave in AOTF 10. AOTF 10 can be used in several modes. In one mode, RF signal 15 is serially tuned through its range at a rate that requires about 10 microseconds for settling plus a system required integration time at each narrow-band wavelength. In another mode, RF signal 15 is moved to any desired frequency within its range with about a 10 microsecond settling time plus the system required integration time for each narrow-band wavelength, or within power density restraints of transducer 12. In yet another mode, a plurality of RF signals are simultaneously applied to transducer 12 to obtain a simultaneous sum of the narrow-band beams of interest. In still yet another mode, a single RF signal 15 is applied throughout analysis.

Figure 2:
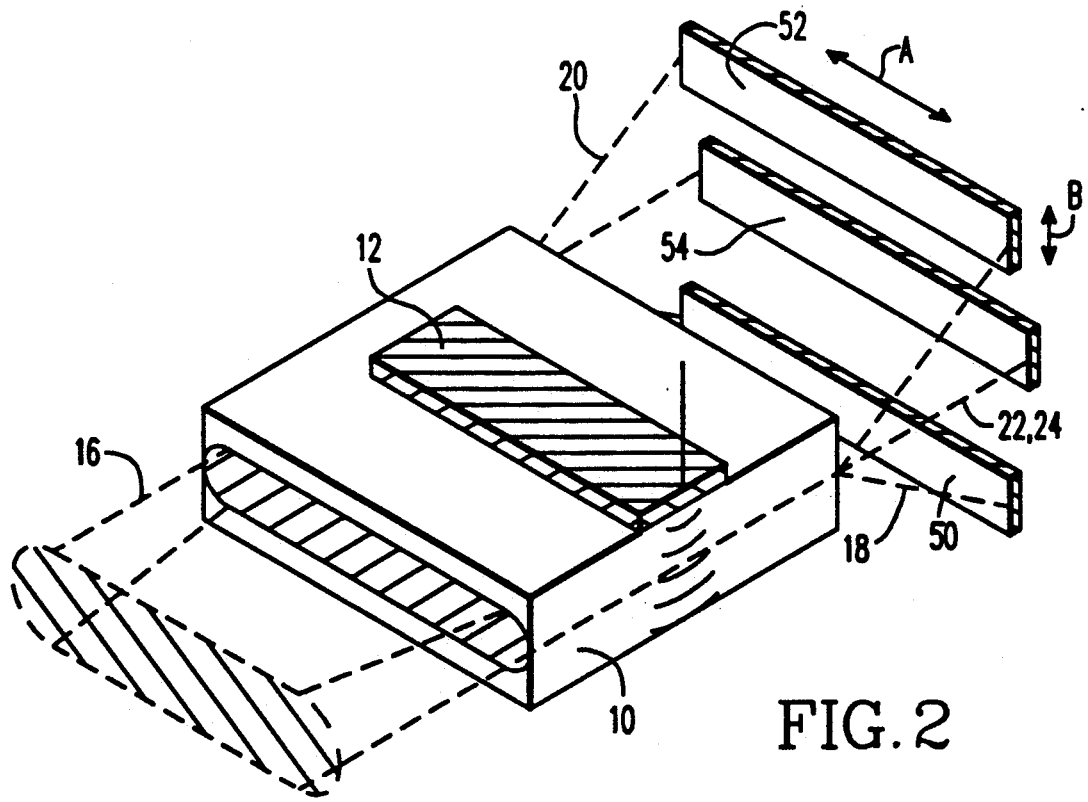
FIG. 2 is a perspective view of an AOTF and detector arrays of an acousto-optic spectrometer/polarimeter according to a first embodiment of the present invention.

FIG. 2 shows a perspective view of AOTF 10 and detector arrays 50, 52, 54 of an acousto-optic spectrometer/polarimeter according to the present invention. Detector arrays 50, 52, 54 may be single point detectors, line array detectors, area array detectors, or the like, where the choice of detector arrays is determined by the use of the spectrometer/polarimeter and not by the requirements invention itself. Detector arrays 50, 52 are respectively positioned to respectively receive diffracted extraordinary narrow-band beam 18 and diffracted ordinary narrow-band beam 20. Detector array 54 is positioned to receive undiffracted ordinary broad-band beam 22 and undiffracted extraordinary broad-band beam 24. Detector arrays 50, 52, 54 are located sufficiently behind AOTF 10 so that each of the respective detector arrays 50, 52, 54 receives substantially all of its corresponding beam, without receiving any of the other beams, or, if needed, separation can be obtained by adjacent 45 degree optical flats.

Because the acousto-optic effect of AOTF 10 is unidirectional in the direction labeled as "A" in FIG. 2, detector arrays 50, 52 54 can extend in direction "A". The useful detection length of detector arrays is determined by the physical length of AOTF 10 in direction "A", this length being limited by, for example, the crystal growth capability in constructing AOTF 10.

Spatial imaging may be obtained in a "staring" mode when the dimensions of each of beams 18, 20, 22, 24 in the direction labeled as "B" in FIG. 2 permit the use of area arrays for detector arrays 50, 52, 54, which are placed in their respective beams 18, 20, 22, 24 in direction "B".

Alternatively, spatial imaging may be obtained in a "pushbroom" mode, wherein a linearly moving platform (not shown) pushes line array type detector arrays 50, 52, 54 and AOTF 10 across a scene in direction "B" in FIG. 2. Spatial imaging may also be obtained in a "scanning" mode, wherein line array type detector arrays 50, 52, 54 and AOTF 10 are scanned across a scene in direction "B". In addition, the signal-to-noise ratio of the "pushbroom" mode and the "scanning" mode may be increased in a "time, delay and integrate" (TDI) mode wherein a plurality of line array type detector arrays 50, 52, 54 are placed in their respective beams 18, 20, 22, 24 in direction "B".

Also, detector arrays 50, 52, 54 may be point detectors. However, in order to obtain spatial imaging with these point detectors, a radar-like raster scan would be required.

Figure 3:
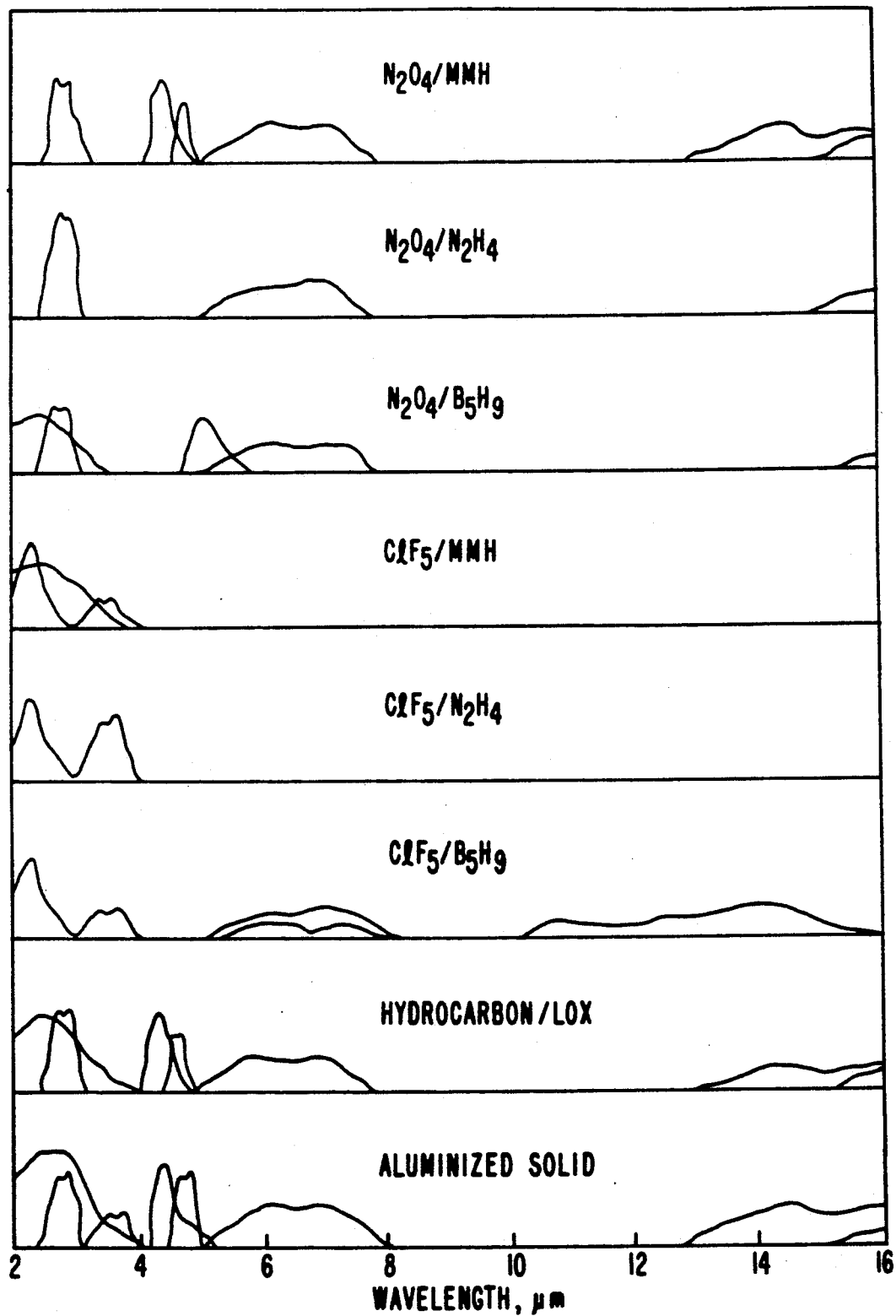
FIG. 3 is a graph of emission spectra for several possible rocket fuels when burning, with intensity plotted on the ordinate axis and wavelength plotted on the abscissa axis.
Figure 4:
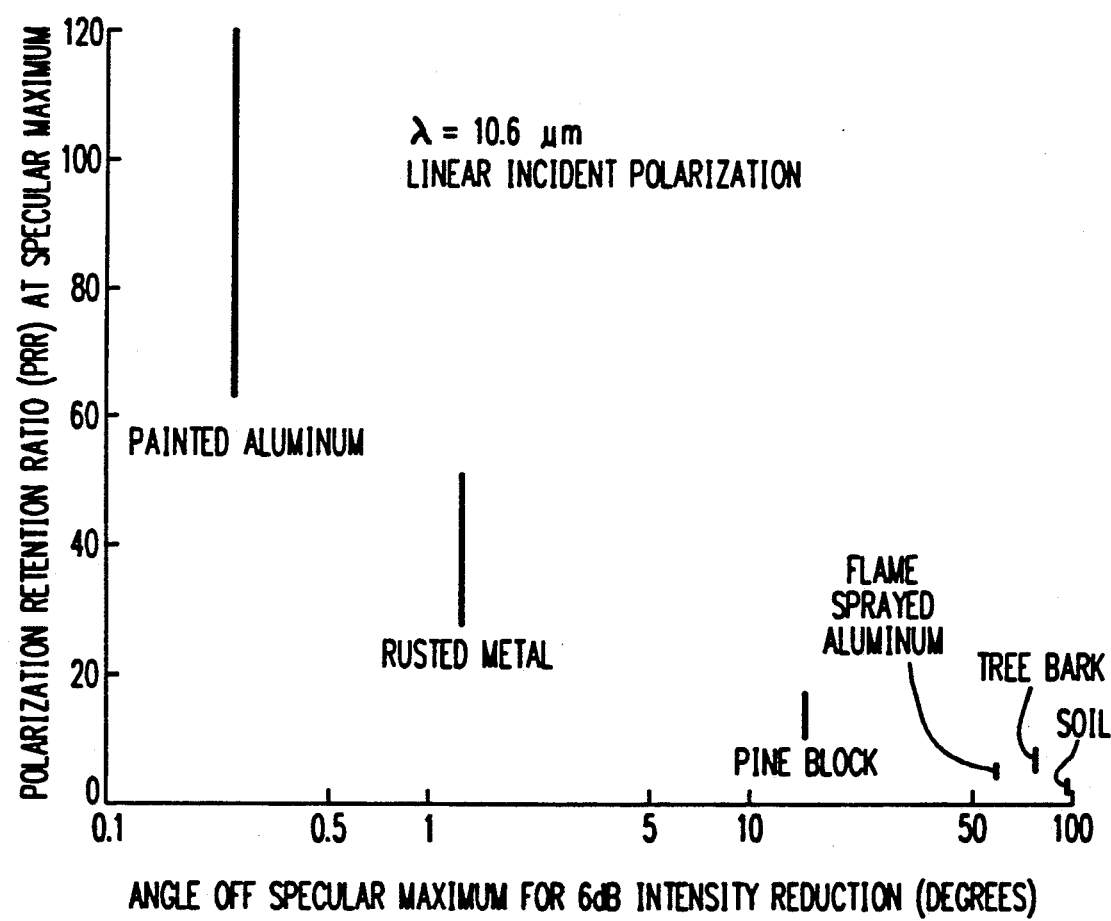
FIG. 4 is a graph of polarization characteristics for several materials, with polarization retention ratio at specular maximum plotted on the ordinate axis and the angle off specular maximum for 6 dB intensity reduction plotted on the abscissa axis.

FIG. 3 and FIG. 4 will now be used to describe advantages of an acousto-optic spectrometer/polarimeter according to the present invention. FIG. 3 is a graph of emission spectra for several possible rocket fuels when burning, with intensity plotted on the ordinate axis and wavelength plotted on the abscissa axis. If, for example, a conventional infrared broad-band sensor was imaging a rocket plume in the 2-8 micron band, the result would provide energy alone, without any way to determine what particular fuel was being burned. However, a spectral scan of an acousto-optic spectrometer/polarimeter according to the present invention permits accurate determination of the spectral makeup of the rocket plume, and consequently the determination of the particular fuel being burned.

FIG. 4 is a graph of polarization characteristics for several materials, with polarization retention ratio at specular maximum plotted on the ordinate axis and the angle off specular maximum for 6 dB intensity reduction plotted on the abscissa axis. As shown in FIG. 4, various scene components have polarization characteristics that can be used to separate different components in a scene. These components might have the same broad-band and narrow-band energy but have different polarization characteristics in either the broad-band or the narrow-band. As will be discussed below, the acousto-optic spectrometer/polarimeter according to the present invention allows a single system to, through the common optical path of AOTF 10, measure all of these optical discriminates so that the outputs of detector arrays 50, 52, 54 may be combined to form an enhanced information output concerning the scene being viewed.

Figure 5A:
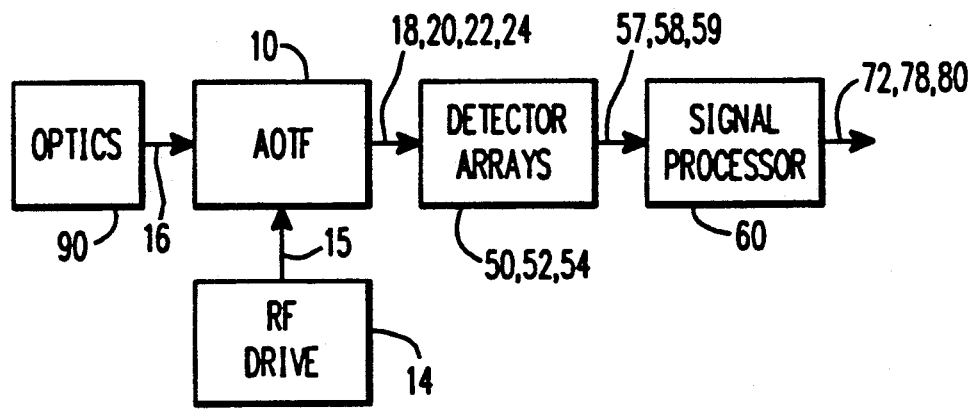
FIG. 5A is a schematic diagram of an acousto-optic spectrometer/polarimeter according to a second embodiment of the present invention, which includes the first embodiment of the present invention shown in FIG. 2.

FIG. 5A is a schematic diagram of an acousto-optic spectrometer/polarimeter according to a second embodiment of the present invention, which includes the first embodiment of the present invention shown in FIG. 2. Quasi-collimated beam 16 is focused on AOTF 10 by optics 90. For example, optics 90 may scan a scene so as to provide detection in a "scanning" mode. Alternatively, optics 90 may be fixed lens system.

Figure 5B:
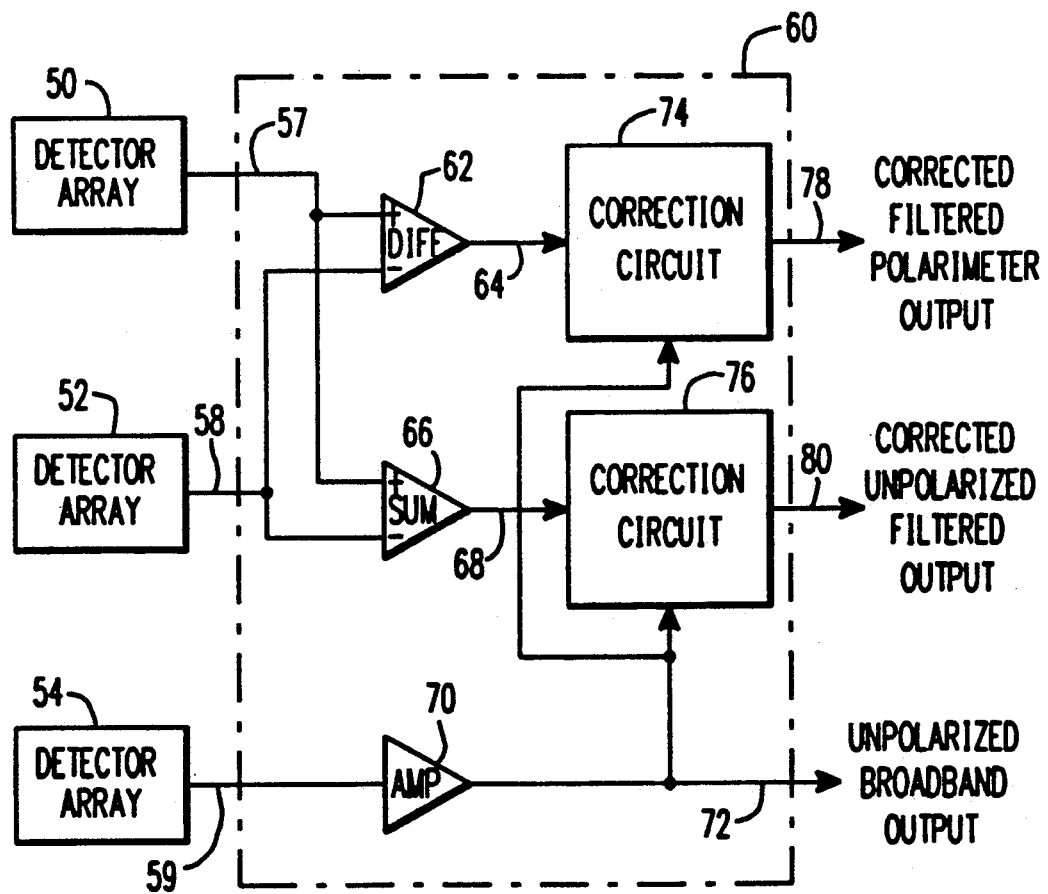
FIG. 5B is a schematic diagram of a signal processor of the acousto-optic spectrometer/polarimeter according to the embodiments shown in FIGS. 5A and 6.
Figure 6:
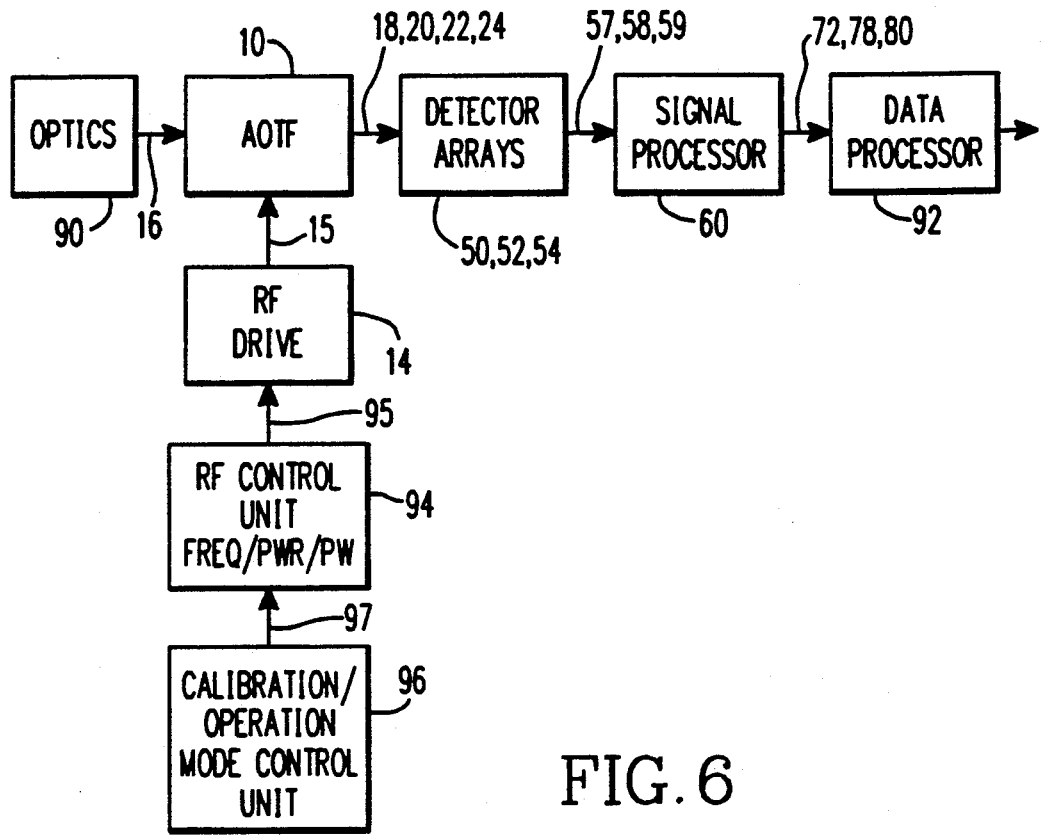
FIG. 6 is a schematic diagram of an acousto-optic spectrometer/polarimeter according to a third embodiment of the present invention.

FIG. 5B is a schematic diagram of a signal processor 60 of the acousto-optic spectrometer/polarimeter according to the embodiments in shown in FIG. 5A and FIG. 6. The respective outputs of detector arrays 50, 52, 54 are array output signals 57, 58, 59. In signal processor 60, array output signals 57, 58, 59 are processed so that they can be analyzed to extract maximum information. No matter what type of detector is used for detector arrays 50, 52, 54, signal processor 60 processes array output signals 57, 58, 59 in much the same way, the only difference being the processing speed and amount of parallel processing required. For example, a relatively great amount of parallel processing and a relatively slow processing speed is required if "staring" mode image detectors are used for detector arrays 50, 52, 54. On the other hand, a relatively small amount of parallel processing and a relatively fast processing speed is required if point detectors in the "pushbroom" mode are used for detector arrays 50, 52, 54.

Signal processor 60 operates in real time, formats array output signals so that recognition algorithms based thereon can describe a scene being observed, and can use either analog or digital logic.

Subtracter 62 provides a difference output 64 by taking the difference between array output signal 57 from detector array 50 and array output signal 58 from detector array 52. Difference output 64 is a measure of the polarization of the scene in the narrow-band light because diffracted extraordinary narrow-band beam 18 and diffracted ordinary narrow-band beam 20 are 90° polarized relative to each other. For example, difference output 64 is zero if quasi-collimated beam 16 is not polarized or is circularly polarized within the narrow-band of beams 18, 20. On the other hand, difference output 64 is a positive or negative signal if quasi-collimated beam 16 is directionally polarized Within the narrow-band of beams 18, 20. In the latter case, the sign of difference output 64 describes whether the directional polarization is ordinary or extraordinary.

Adder 66 provides a sum output 68 by adding array output signal 57 from detector array 50 and array output signal 58 from detector array 52. Sum output 68 masks the polarization effects of the scene and contains nearly 100% of the available energy from quasi-collimated beam 16 within the narrow-band of beams 18, 20. That is, sum output 68 is similar to the output obtained from a conventional spectrometer.

An amplifier 70 provides an unpolarized broad-band output 72 by amplifying array output signal 59 from detector array 54, which contains all of the remaining broad-band light information. That is, unpolarized broad-band output 72 contains all of the broad-band light information from undiffracted ordinary broad-band beam 22 and undiffracted extraordinary broad-band beam 24.

When performing spectrographic measurements with a conventional spectrometer in the laboratory, the atmosphere between the sensor and the scene can be controlled, as can the scene and sensor positioning, and so spectrographic measurements taken describe the spectral characteristics of the scene with little need for additional calibration. However, outside of the laboratory, the atmosphere is variable due to changes in illumination, smoke, clouds, rain, changing scene/sensor distance, and the like.

The present invention weighs the usefulness of spectrographic and polarization information obtained in such less than ideal conditions. Detector array 54 sees some average blackbody energy, such as reflected 5900° Kelvin solar radiated energy for visible imaging in sun-radiated scenes, radiated 200°–300° Kelvin earth radiated energy for infrared imaging of the earth, or the like. On the other hand, detector arrays 50, 52 see emission, such as rocket plumes and lasers, and absorption, such as engine exhausts and poison gases, as excursions from the mean, spectrally broad average scene energy.

Therefore, in such conditions, e.g., where the atmosphere is variable due to changes in illumination, smoke, clouds, rain, changing scene/sensor distance, and the like, it is preferable to use unpolarized broad-band output 72 to correct difference output 64 and sum output 68. As shown in FIG. 5B, correction circuits 74, 76 respectively provide corrected filtered polarimeter output 78 and corrected unpolarized filtered output 80 by respectively correcting difference output 64 and sum output 68 based on unpolarized broad-band output 72.

More specifically, each of the correction circuits 74, 76 compares changes in its narrow-band based input to changes in its broad-band based input and provides a corrected output by assigning a usefulness factor based on the comparison. For example, if the narrow-band based sum output 68 increases or decreases and unpolarized broad-band output 72 does not correspondingly increase or decrease, then the change is due to a narrow-band change in absorption or emission, and the assigned usefulness factor would be high. Similarly, if the narrow-band based difference output 64 increases or decreases and unpolarized broad-band output 72 does not correspondingly increase or decrease, then the change is due to a narrow-band change in polarization, and the assigned usefulness factor would be high.

However, if both the narrow-band based sum output 68 and unpolarized broad-band output 72 correspondingly increase or decrease, then the change is likely due to a broad-band change in conditions, and the assigned usefulness factor would be low. Similarly, if the narrow-band based difference output 64 and unpolarized broad-band output 72 correspondingly increase or decrease, then the change is likely due to a broad-band change in conditions, and the assigned usefulness factor would be low.

Alternatively, correction circuits 74, 76 may be omitted, and difference output 64 and sum output 68 used directly for obtaining polarization and spectrographic information, respectively.

In addition, unpolarized broad-band output 72 can be used for several other purposes. The unpolarized broad-band output 72 typically provides the best signal-to-noise ratio because the energy of each of narrow-band beams 18, 20 may only be a few percent of the total sensitivity range of detector arrays 50, 52. Thus, in limited situations where the energy of quasi-collimated beam 16 is so low that the narrow-band arrays are not useable, unpolarized broad-band output 72 may provide the only useful information. Also, unpolarized broad-band output 72 can be compared to commonly available broad-band data for target recognition, where spectrographic and polarization information are obtained after a target is recognized by broad-band comparison.

FIG. 6 is a schematic diagram of an acousto-optic spectrometer/polarimeter according to a third embodiment of the present invention. Unpolarized broad-band output 72, corrected filtered polarimeter output 78 and corrected unpolarized filtered output 80 are input into a data processor 92, so that outputs 72, 78, 80 can be analyzed. For example, data processor 92 may be a microprocessor for comparing outputs 72, 78, 80 to known data for providing target recognition.

A RF control unit 94 controls the frequency, power and bandwidth of RF signal 15 through a RF control signal 95. The wavelength of diffracted extraordinary narrow-band beam 18 and diffracted ordinary narrow-band beam 20 is determined by the frequency of RF signal 15, which is controlled by RF control unit 94. The percentage of the available narrow-band light energy that is actually within diffracted extraordinary narrow-band beam 18 and diffracted ordinary narrow-band beam 20 (diffraction efficiency) is determined by the power of RF signal 15. Diffraction efficiency varies from zero percent when RF signal 15 has zero power, to 100 percent when RF signal 15 has some finite amount of power. In theory, as the power of RF signal 15 is increased monotonically from zero, diffraction efficiency goes from zero percent to 100 percent, and cyclically back to zero percent. In practice, however, diffraction efficiency is within the range from zero percent to the first 100 percent.

In theory, the wavelength of diffracted extraordinary narrow-band beam 18 and diffracted ordinary narrow-band beam 20 is inversely proportional to the frequency of RF signal 15. In practice, this relationship holds quite true. Also, in theory, the required power of RF signal 15 is proportional to the square of the wavelength of diffracted extraordinary narrow-band beam 18 and diffracted ordinary narrow-band beam 20, at least in the linear region. In practice, however, this relationship varies considerably based on a number of factors which include: the efficiency of transducer 12, which can vary considerably over its range of operation; temperature; and time.

For maximum efficiency and accuracy, it is desirable to operate the acousto-optic spectrometer/polarimeter of the present invention at or near 100 percent diffraction efficiency over its entire range of operation. This contrasts with conventional AOTF devices, which instead operate with a constant RF signal power over their entire range of operation. Even if initially calibrated and corrected, point-to-point, against a calibration reference, conventional AOTF signal-to-noise ratios as the diffraction efficiency changes. Also, in conventional AOTF devices, calibration accuracy varies as a function of local diffraction efficiency due to the local slope value of diffraction efficiency change per RF power change. Generally, variations in calibration accuracy approach zero at 100 percent diffraction efficiency, and are at a worst case near 50 percent diffraction efficiency.

A calibration and operation mode control unit 96 controls RF control unit 94 through calibration and operation control signal 97, which is used to control the power of RF signal 15 so that the acousto-optic spectrometer/polarimeter of the present invention is operated at or near 100 percent diffraction efficiency over its entire range of operation. Calibration and operation mode control unit 96 includes a memory, in which is stored the calibrated point-to-point relationship between the power and frequency of RF signal 15 necessary for maintaining 100 percent diffraction efficiency.

Calibration and operation control signal 97 is also used to control the operation mode of the acousto-optic spectrometer/polarimeter of the present invention by controlling the pulse width of RF signal 15. In a most basic embodiment, RF signal 15 could be a continuous wave signal, and consequently, each of beams 18, 20, 22, 24 would continuously pass through AOTF 10 for each RF/wavelength dwell time. However, there are three advantages to having calibration and operation mode control unit 96 vary the duty cycle by changing the pulse width of RF signal 15 from zero percent duty cycle to 100 percent duty cycle at a designated repetition rate that is much less than the frequency of RF signal 15. The first advantage relates to the physical characteristics AOTF 10 in certain wavelengths and wavelength ranges, where the energy of the acoustic wave needed for 100 percent diffraction efficiency causes a temperature-rise in AOTF 10, effecting calibration or possibly damaging AOTF 10. Calibration and operation mode control unit 96 maintains the power of RF signal 15 at a value to obtain 100 percent efficiency, while either maintaining the pulse width of RF signal 15 if no such temperature-rise is encountered or decreasing the pulse width of RF signal 15 as the frequency of RF signal 15 is changed.

The second advantage relates to operational situations where teh variations in scene energy through AOTF 10 exceed the instantaneous dynamic range of detector arrays 50, 52, 54. In this situation, calibration and operation mode control unit 96 varies the pulse width of RF signal 15 from just above zero percent duty cycle to near 100 percent duty cycle as an automatic light control (ALC) in order to extend the effective dynamic range of detector arrays 50, 52, 54. Alternatively, calibration and operation mode control unit 96 could decrease the power of RF signal 15, but this would effect calibration.

The third advantage is that by performing synchronous demodulation of RF signal 15 while calibration and operation mode control unit 96 is changing the pulse width of RF signal 15 from just above zero percent duty cycle to near 100 percent duty cycle, the minimum detection sensitivity of detector arrays 50, 52, 54 is enhanced.

Each of the above-mentioned advantages greatly effect diffracted extraordinary narrow-band beam 18 and diffracted ordinary narrow-band beam 18, and only have a second order effect on undiffracted ordinary broad-band beam 22 and undiffracted extraordinary broad-band beam 24. However, relative to the second advantage, i.e., varying the pulse width of RF signal 15 as an ALC to extend the effective dynamic range of detector arrays 50, 52, 54, undiffracted ordinary broad-band beam 22 and undiffracted extraordinary broad-band beam 24 are used by correction circuits 74, 76 precisely because broad-band beams 22, 24, in general, do not vary as quickly as diffracted extraordinary narrow-band beam 18 and diffracted ordinary narrow-band beam 20. As discussed above, it is important to compare narrow-band beams 18, 20 changes relative to broad-band beams 22, 24 changes in order to understand what is happening in the scene in a non-cooperative situation, e.g., when there is a change in illumination. Broad-band beams 22, 24 are a spectral average over the entire scene wavelength range, and may by using larger detector arrays 50, 52, 54 and a wider optical field of view, average over a larger spatial region, and by correction circuits 74, 76, modify the narrow-band based difference output 64 and sum output 68 to subtract out changes that are due to broad-band beam changes, as opposed to narrow-band beam changes relative to broad-band beam changes.

Figure 7:
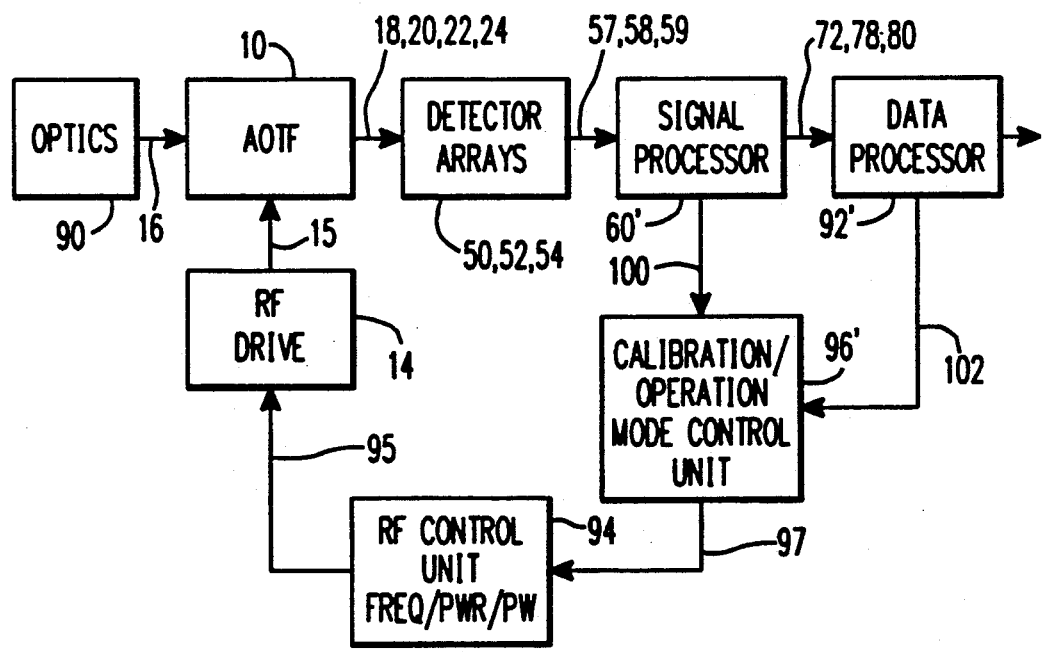
FIG. 7 is a schematic diagram of an acousto-optic spectrometer/polarimeter having closed-loop calibration according to a fourth embodiment of the present invention.

FIG. 7 is a schematic diagram of an acousto-optic spectrometer/polarimeter having closed-loop calibration according to a fourth embodiment of the present invention. Even though the acousto-optic spectrometer/polarimeter in FIG. 6 is calibrated point-to-point with the necessary relationship between the power and frequency of RF signal 15 for maintaining 100 percent diffraction efficiency, the calibration may lose its accuracy, e.g., through aging. In FIG. 7, a calibration and operation mode control unit 96' performs the same functions as calibration and operation mode control unit 96 in FIG. 6, except that calibration and operation mode control unit 96' also re-calibrates so as to maintain 100 percent diffraction efficiency. This re-calibration corrects for temperature, aging, and other effects over the lifetime to the acousto-optic spectrometer/polarimeter of the present invention. A sampling signal 100, which may be either corrected unpolarized filtered output 80 or a sequential combination of array output signals 57, 58, is received in calibration and operation mode control unit 96' from signal processor 60'. In all other respects signal processor 60' in FIG. 7 is the same as signal processor 60 in FIGS. 5A and 6. Sampling signal 100 may be sampled at the request of the operator or automatically during operation.

Calibration and operation mode control unit 96' may calibrate for 100 percent diffraction efficiency by sampling corrected unpolarized filtered output 80, while viewing a scene of known spectral characteristics. Alternatively, calibration and operation mode control unit 96' may calibrate for 100 percent diffraction efficiency by sequentially sampling array output signals 57, 58, while viewing a scene of known polarization in order to calibrate each of the narrow-band beams individually.

Similar to sample signal 100, a data sample signal 102 from data processor 92', based on either corrected unpolarized filtered output 80 or a sequential combination of array output signals 57, 58, may be sampled by calibration and operation mode control unit 96' in order to calibrate the acousto-optic spectrometer/polarimeter for 100 percent diffraction efficiency.

Numerous modifications and adaptations of the present invention will be apparent to those skilled in the art. For example, line detector 54 for detecting broad-band beams 22, 24 may be slightly different than detector arrays 50, 52 for respectively detecting narrow-band beams 18, 20. That is, the spatial dimension of detector array 54 relative to detector arrays 50, 52 may be increased so that the black body average would be of several narrow-band scene resolutions, thereby making the black body average more accurate. By making the black body average more accurate, corrected filtered polarimeter output 78 and corrected unpolarized filtered output 80 obtained from correction circuits 74, 76 will also be more accurate.

Also, two or more spatially contiguous optical filters may be placed in either of the two-dimensions of detector array 54, i.e., direction "A" and direction "B". These optical filters would be fixed in wavelength, relatively broad in bandwidth and spectrally spaced so that at least one optical filter is on each end of the total spectral band of interest. This modification would add a fourth channel to FIG. 5, which would provide a component signal indicative of components of broad-band beams 22, 24. The component signal would be used to describe the slope of the total blackbody energy so that the actual emitted or reflected blackbody temperature would be obtained rather than assumed. This would add, at least in some cases, an additional level of information by which more accurate information may be obtained.

Thus, it is intended by the following claims to cover all such modifications and adaptations which fall within the true spirit and scope of the invention.

What is claimed is:

1. An acousto-optic spectrometer/polarimeter for analyzing an incident broad-band beam, comprising:
   an acousto-optic device for separating the incident broad-band beam into a diffracted extraordinary narrow-band beam, a diffracted ordinary narrow-band beam, and at least one undiffracted broad-band beam;
   first detector means, positioned so as to receive at least a portion of said diffracted extraordinary narrow-band beam, for providing a first signal based upon said diffracted extraordinary narrow-band beam;
   second detector means, positioned so as to receive at least a portion of said at least one undiffracted broad-band beam, for providing a second signal based upon said at leat one undiffracted broad-band beam;
   third detector means, positioned so as to receive at least a portion of said diffracted ordinary narrow-band beam, for providing a third signal based upon said diffracted ordinary narrow-band beam;
   subtracter means for providing a difference output by taking the difference between said first signal and said third signal; and
   adder means for providing a sum output by adding said first signal and said third signal.

2. An acousto-optic spectrometer/polarimeter as recited in claim 1, wherein said acousto-optic device includes an acousto-optic tunable filter.

3. An acousto-optic spectrometer/polarimeter as recited in claim 2, further comprising:
   transducer means for transducing an acoustic wave in said acousto-optic tunable filter;
   radio frequency drive means for providing a radio frequency signal to said transducer means; and
   radio frequency control means for controlling at least one of the frequency, power and pulse width of said radio frequency signal.

4. An acousto-optic spectrometer/polarimeter as recited in claim 3, wherein said radio frequency control means includes:
   means for adjusting at least one of the power and pulse width for each frequency of said radio frequency signal so that said acousto-optic tunable filter operates at substantially 100 percent diffraction efficiency.

5. An acousto-optic spectrometer/polarimeter as recited in claim 3, wherein said radio frequency control means includes:
   means for serially tuning said radio frequency signal from one end of a wavelength spectrum to the other end of said wavelength spectrum;
   means for randomly tuning said radio frequency signal of any frequency within said wavelength spectrum; and
   means for simultaneously tuning said radio frequency signal at a plurality of frequencies within said wavelength spectrum.

6. An acousto-optic spectrometer/polarimeter as recited in claim 1, wherein:
   said first, second and third detector means each include at least one of a point array, a line array, and an area array.

7. An acousto-optic spectrometer/polarimeter as recited in claim 1, wherein:
   said first, second and third detector means operate in a staring mode.

8. An acousto-optic spectrometer/polarimeter as recited in claim 1, wherein:
   said first, second and third detector means operate in at least one of a pushbroom mode and a scanning mode.

9. An acousto-optic spectrometer/polarimeter as recited in claim 8, wherein:
   said first, second and third detector means each include a plurality of detector array detectors and operate in a time, delay and integrate mode.

10. An acousto-optic spectrometer/polarimeter for analyzing an incident broad-band beam, comprising:
    an acousto-optic device for separating the incident broad-band beam into a diffracted extraordinary narrow-band beam, a diffracted ordinary narrow-band beam, and at least one undiffracted broad-band beam;
    first detector means, positioned so as to receive at least a portion of said diffracted extraordinary narrow-band beam, for providing a first signal based upon said diffracted extraordinary narrow-band beam;
    second detector means, positioned so as to receive at least a portion of said at least one undiffracted broad-band beam, for providing a second signal based upon said at least one undiffracted broad-band beam;
    third detector means, positioned so as to receive at least a portion of said diffracted ordinary narrow-band beam, for providing a third signal based upon said diffracted ordinary narrow-band beam;
    subtracter means for providing a difference output by taking the difference between said first signal and said third signal;
    adder means for providing a sum output by adding said first signal and said third signal; and
    correction circuit means for correcting, based on said second signal, at least one of said difference output and said sum output.

11. An acousto-optic spectrometer/polarimeter as recited in claim 10, wherein said correction circuit means includes:
    means for providing a corrected narrow band polarimeter output by comparing a change in said difference output with a change in said second signal.

12. An acousto-optic spectrometer/polarimeter as recited in claim 10, wherein said correction circuit means includes:
    means for providing a corrected unpolarized narrow band output by comparing a change in said sum output with a change in said second signal.

13. An acousto-optic spectrometer/polarimeter as recited in claim 12, wherein said acousto-optic device includes an acousto-optic tunable filter.

14. An acousto-optic spectrometer/polarimeter as recited in claim 12, further comprising:

transducer means for transducing an acoustic wave in said acousto-optic tunable filter;

radio frequency drive means for providing a radio frequency signal to said transducer means; and radio frequency control means for controlling at least one of the frequency, power and pulse width of said radio frequency signal.

15. An acousto-optic spectrometer/polarimeter as recited in claim 14, wherein said radio frequency control means includes:

means for adjusting at least one of the power and pulse width for each frequency of said radio frequency signal, based on a comparison of said corrected unpolarized filtered output to a reference, so that said acousto-optic tunable filter operates at substantially 100 percent diffraction efficiency.

16. An acousto-optic spectrometer/polarimeter as recited in claim 14, wherein said radio frequency control means includes:

means for adjusting at least one of the power and pulse width for each frequency of said radio frequency signal, based on a comparison of said first and second signals with a reference, so that said acousto-optic tunable filter operates at substantially 100 percent diffraction efficiency.

17. A spectrometer/polarimeter for analyzing an incident broad-band beam, comprising:

an optical filter, said optical filter separating the incident broad-band beam into a diffracted extraordinary narrow-band beam, a diffracted ordinary narrow-band beam, and at least one undiffracted broad-band beam;

a first detector positioned to receive at least a portion of said diffracted extraordinary narrow-band beam, said first detector providing a first signal based upon said diffracted extraordinary narrow-band beam;

a second detector positioned to receive at least a portion of said diffracted ordinary narrow-band beam, said second detector providing a second signal based upon said diffracted ordinary narrow-band beam;

a subtracter, said subtracter providing a difference output by taking the difference between said first signal and said second signal, where said difference is the polarization intensity and polarization direction of said diffracted ordinary narrow-band beam and said diffracted extraordinary narrow-band beam; and an adder for use as a spectrometer to provide a sum output by adding said first and second signals, whereby said sum is the un-polarized total of measure of the intensity of said diffracted ordinary narrow-band beam and said diffracted extraordinary narrow-band beam.

18. A spectrometer/polarimeter as recited in claim 17, further comprising:

a third detector positioned to receive at least a portion of said at least one undiffracted broad-band beam, said third detector providing a third signal based upon said at least one undiffracted broad-band beam; and a correction circuit providing a corrected unpolarized filtered output by comparing a change in said sum output with a change in said third signal.

19. A polarimeter as recited in claim 17, wherein:

said optical filter is an acousto-optic tunable filter.

* * * * *